Feb. 15, 1949. T. C. MAHON 2,461,830
ANTISIPHON VALVE
Filed Feb. 28, 1945
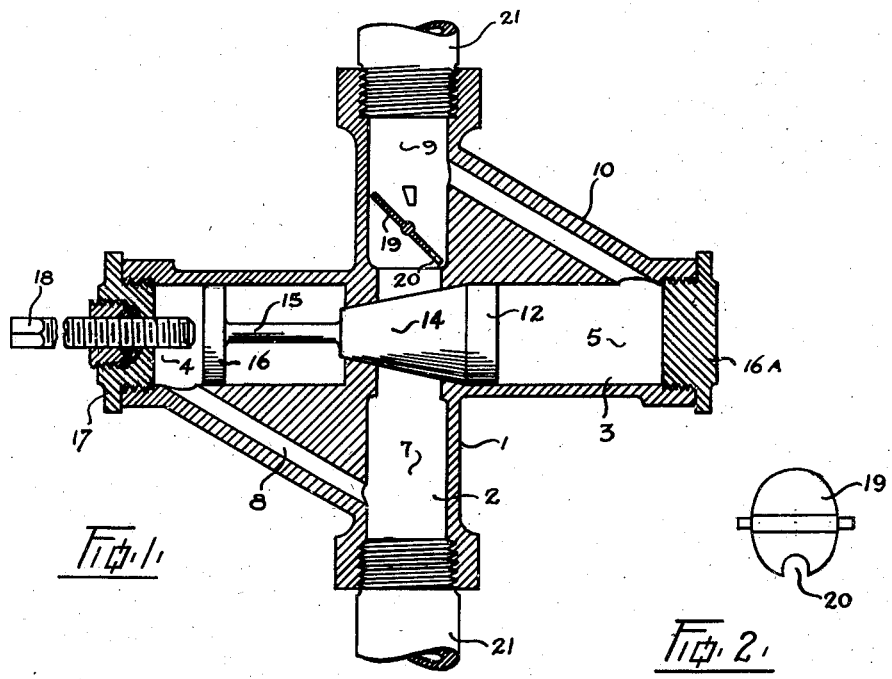
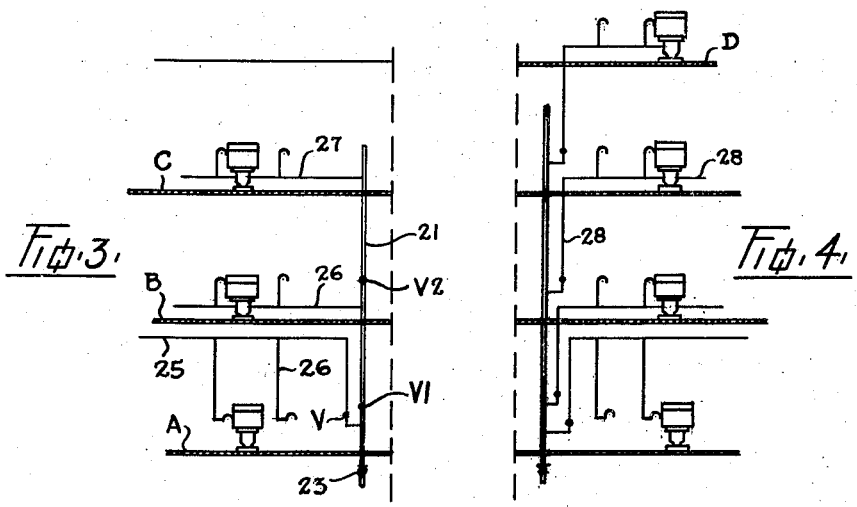
INVENTOR
THOMAS C. MAHON
Ernest E Carver
ATTORNEY Patented Feb. 15, 1949

2,461,830

UNITED STATES PATENT OFFICE 2,461,830

ANTISIPHON VALVE

Thomas C. Mahon, Burnaby, British Columbia, Canada

Application February 28, 1945, Serial No. 580,123

2 Claims. (Cl. 137—153)

My invention relates to improvements in anti-syphon valves which are particularly adapted for use in water supply risers for the purpose of preventing the water in toilet tanks and the like from being syphoned back into the line in response to an undue drop in pressure in the riser immediately below the anti-syphon valve. A further object is to provide means whereby the valve will function as above described without opening any part of said valve to the atmosphere either during operation or when functioning as a full open passage in the riser. Further objects are to provide a structure whereby the functioning of the valve is accelerated by the static head of water above the valve and the suction set up below the valve by the drop in pressure in the riser below said valve, and to provide a valve which will allow an immediate resumption of water flow in the riser on restoration of normal pressure without causing air lock or pulsation in said valve, and also to provide means for opening the valve manually when desired for quick draining.

Referring to the drawings:

Fig. 1 is a transverse sectional view of the invention.

Fig. 2 is a general view of the butterfly valve.

Figs. 3 and 4 are diagrammatic views of typical plumbing layouts, showing the position of the anti-syphon valves controlling each floor.

In the drawings like characters of reference indicate corresponding parts in each figure.

The numeral 1 indicates generally a valve body having a vertical bore 2 and a horizontal bore 3, which latter defines two chambers respectively indicated by the numerals 4 and 5. The chamber 4 communicates with the lower portion 7 of the vertical bore 2 through a passage 8, and the chamber 5 communicates with the upper portion 9 of the bore 2 through a passage 10.

Slidably mounted in the horizontal bore 3 is a valve 12 which preferably consists of a conical plunger 14 having a stem 15 at its narrow end which is provided with a piston 16 of substantially the same diameter as the large head end of the plunger 14. The valve 12 is freely mounted within the bore 3 and is adapted to close off communication between upper and lower portions 9 and 7 of the bore 2 from each other.

The chamber 5 is capped with a plug 16A and the chamber 4 is similarly capped with a plug 17 having a threaded stem 18 extending therethrough to enable the valve 12 to be moved to open manually.

Pivotally mounted in the upper portion 9 of the bore 2 is a butterfly valve 19 having a cutaway portion 20 to produce an unbalanced condition and allow said butterfly valve to rest as shown, with its lower extremity directed substantially parallel to the passage 10.

The upper and lower ends of the bore 2 are threaded for connecting the valve in a water supply pipe or riser 21.

The valve is adapted to be installed in the water risers in the manner shown in Figures 3 and 4. In Figure 3 a basement A and two upper floors B and C are provided with water from a riser 21 having a regular stop and waste valve 23 at a suitably low point. A lateral 25 is taken from the riser 21 from which branch pipes 26 lead to the various fixtures. At the point of connection between the riser and the lateral 25, an anti-syphon valve V is installed. Laterals 26 and 27 are taken off the riser 21 to supply the requirements of floors B and C and valves V1 and V2 are respectively provided in the riser to protect the fixtures on said laterals.

In tall buildings where the riser 28 is of relatively large diameter as in Figure 4, the laterals 29 are all taken off below the floors they serve and are each provided with a valve V adjacent its point of connection with the riser 28.

In operation, as long as the pressure in the system is sufficient to keep the risers and laterals full of water to the top, the anti-syphon valves will remain open with the valve 12 retracted into the chamber 5. Should the water pressure drop to the extent that water flowing through a ball valve, say of a toilet on floor C of Figure 3, would syphon back, the flow in the upper portion 9 of the bore 2 will be initially diverted by the valve 19 through the passage 10 thus causing a force to be applied to the valve 12 to close it. The force thus applied to the valve 12 is augmented by the suction due to the downward flow through the lower portion 7 of the bore 3, this flow communicating with the chamber 4 exerts a pull on the piston so that the closing action of the valve is both rapid and certain. With the closing of the valve, the riser and laterals above said valve remain substantially full ready to again function immediately after the water pressure is restored. It will be obvious that should the water pressure continue to drop, such as would occur following a break in an adjacent main or a heavy draw off in case of fire, the anti-syphon valves taken off a riser will close one after another commencing with the one controlling the upper floor of the building, thus preventing any anti-syphoning on any floor affected.

If it should be desired to drain the water system, it may be done by opening all the anti-syphon valves on the riser, opening the stop and waste valve at the foot of the riser and opening one faucet on each floor successively starting at the uppermost floor, this will allow the water to drain quite rapidly from the various laterals. If it is not essential that the draining take place rapidly, all faucets are left closed, the anti-syphon valves left in normal operating position and the stop and waste valve opened. With this valve arrangement, water in seeping from the stop and waste will allow some air to enter the riser and form air bubbles which will rise to elevated points in the system, the weight of water below any of these bubbles will create sub-atmospheric conditions in said bubbles or pockets, which will result in a downward movement of the water column or columns below each of said pockets. This downward movement of water will result in further discharge through the waste opening. Each downward flow will attain a momentum such as to stretch the air pockets to a tension or partial vacuum greater than the dead weight of the suspended water, consequently the column will come to rest and return in an upward direction far enough to again admit some air through the waste opening. This pulsation will continue, alternately discharging water and drawing in air to replace that discharged, until the riser and its graded branches are substantially dry. This function is identical with that taking place when employing an inverted bottle, though its action is slower.

What I claim as my invention is:

1. An anti-syphon valve comprising a body having a vertical and a horizontal bore and being adapted for connection in a riser of a water supply line, a plunger adapted to move to close off the water flow between the upper and lower portion of said bore, a passageway communicating between the upper part of the vertical bore and one end of the valve and a passageway communicating between the lower part of the vertical bore and the opposite end of the valve, and an unbalanced butterfly valve rockingly mounted in the upper part of the vertical bore to impede a down flow of water past the plunger in response to drop in pressure in the lower part of the bore, said butterfly valve being adapted to rest normally in an inclined position thereby to direct a flow of water through the first named passageway to move the plunger into closed position.

2. An anti-syphon valve comprising a body having a vertical and a horizontal bore and being adapted for connection in a riser of a water supply line, a plunger slidably mounted in the horizontal bore adapted to move to close off the water flow between the upper and lower portion of said bore, a passageway communicating between the upper part of the vertical bore and one end of the valve and a passageway communicating between the lower part of the vertical bore and the opposite end of the valve, and means interposed between the plunger and the upper part of the vertical bore for automatically restricting the effective cross sectional area of the upper part of the bore which lies between the entrance to the first named passageway and the plunger as a drop in pressure occurs in the lower part of said vertical bore and for directing a down flow through the first named passageway to move the plunger to close the valve.

THOMAS C. MAHON.

REFERENCES CITED

The following references are of record in the file of this patent:

UNITED STATES PATENTS

| Number | Name | Date |
| --- | --- | --- |
| 1,105,991 | Miller | Aug. 4, 1914 |
| 1,787,686 | Kerr | Jan. 6, 1931 |
| 1,959,909 | Farmer | May 22, 1934 |
| 2,273,118 | Langdon | Feb. 17, 1942 |
| 2,292,871 | Dunn | Aug. 4, 1942 |
| 2,328,118 | Ahlport | Aug. 31, 1943 |

FOREIGN PATENTS

| Number | Country | Date |
| --- | --- | --- |
| 32,593 | Austria | Apr. 10, 1908 |